(12) United States Patent
Ise et al.

(10) Patent No.: US 9,343,771 B2
(45) Date of Patent: May 17, 2016

(54) ENERGY STORAGE DEVICE AND METHOD FOR THE REVERSIBLE STORAGE OF ENERGY

(75) Inventors: Martin Ise, Erlangen (DE); Harald Landes, Rückersdorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 340 days.

(21) Appl. No.: 13/811,034

(22) PCT Filed: May 19, 2011

(86) PCT No.: PCT/EP2011/058136
§ 371 (c)(1),
(2), (4) Date: Jan. 18, 2013

(87) PCT Pub. No.: WO2012/010343
PCT Pub. Date: Jan. 26, 2012

(65) Prior Publication Data
US 2013/0112569 A1  May 9, 2013

(30) Foreign Application Priority Data
Jul. 20, 2010  (DE) .......................... 10 2010 027 690

(51) Int. Cl.
| | |
|---|---|
| *C25B 1/04* | (2006.01) |
| *H01M 8/18* | (2006.01) |
| *H01M 8/06* | (2006.01) |
| *H01M 8/04* | (2016.01) |
| *F17C 11/00* | (2006.01) |
| *H01M 8/12* | (2016.01) |

(52) U.S. Cl.
CPC ................. *H01M 8/186* (2013.01); *C25B 1/04* (2013.01); *F17C 11/005* (2013.01); *H01M 8/04014* (2013.01); *H01M 8/04029* (2013.01); *H01M 8/04216* (2013.01); *H01M 8/0606* (2013.01); *H01M 8/0656* (2013.01); *H01M 8/184* (2013.01); *H01M 8/188* (2013.01); *H01M 2008/1293* (2013.01); *Y02E 60/366* (2013.01); *Y02E 60/525* (2013.01); *Y02E 60/528* (2013.01); *Y02P 20/129* (2015.11); *Y02P 20/133* (2015.11); *Y02P 20/134* (2015.11)

(58) Field of Classification Search
CPC . H01M 8/186; H01M 8/0656; H01M 8/0606; C25B 1/04; C25B 1/10
See application file for complete search history.

(56) References Cited

U.S. PATENT DOCUMENTS 5,492,777 A * 2/1996 Isenberg et al. ................ 429/419

FOREIGN PATENT DOCUMENTS

WO  WO 2009148505 A2 * 12/2009 .......... H01M 8/0273

\* cited by examiner

*Primary Examiner* — Nicholas A Smith

(57) ABSTRACT

An energy storage device for a reversible storage of energy has a reversibly designed metal/metal oxide storage unit for indirectly storing energy in form of a fluid material and a reversibly designed electrolysis device for providing and using the fluid material in an electrolysis reaction. The metal/metal oxide storage unit is disposed spatially separated from the electrolysis device. A fluid exchanging unit is provided for exchanging the fluid material between the reversibly designed metal/metal oxide storage unit and the electrolysis device, and a heat exchanging unit is provided for exchanging thermal energy between the metal/metal oxide storage unit and the electrolysis device. Further, a method for a reversible storage of energy is provided.

10 Claims, 3 Drawing Sheets

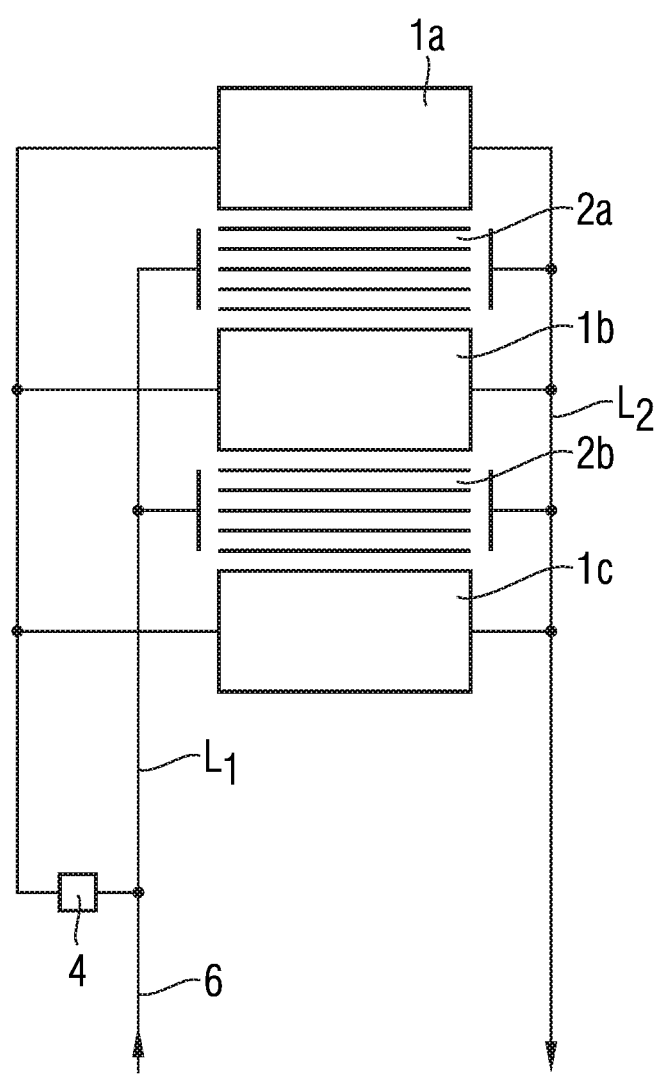

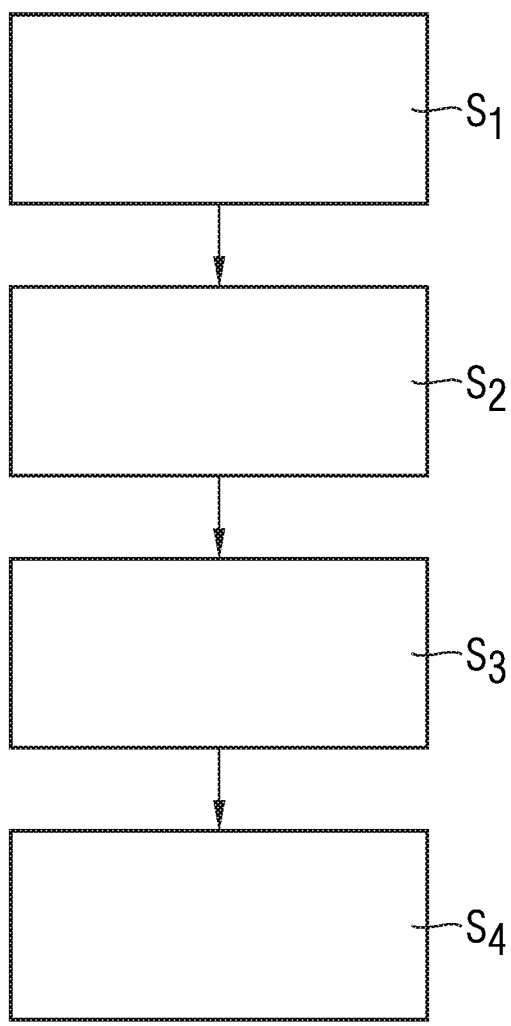

ENERGY STORAGE DEVICE AND METHOD FOR THE REVERSIBLE STORAGE OF ENERGY

CROSS REFERENCE TO RELATED APPLICATIONS

This application is the US National Stage of International Application No. PCT/EP2011/058136 filed May 19, 2011, and claims the benefit thereof. The International Application claims the benefits of German Patent Application No. 20 2010 027 690.1 DE filed Jul. 20, 2010. All of the applications are incorporated by reference herein in their entirety.

FIELD OF INVENTION

The invention relates to an energy storage device for reversibly storing energy, in particular from renewable energy sources, and to a corresponding method.

BACKGROUND OF INVENTION

As a result of the ever increasing use of energy from renewable energy sources, e.g. from wind energy or solar energy, it is necessary to have means of storing the increasingly large amounts of energy produced thereby. As the generation of electrical energy from renewable sources is subject to weather conditions such as cloud cover or wind strength, the generation of electrical energy fluctuates and it is much more difficult to plan for the availability of the electrical energy.

In order to compensate for daily fluctuations and also provide long-term storage on account of the seasonal variations in energy generation from renewable sources, it is desirable to store/buffer the electrical energy generated. Hitherto electrical energy from renewable energy sources, because of their relatively low output, has generally been fed directly into the grid and in some cases conventional power plants have been derated accordingly, making it unnecessary to store the electrical energy from renewable energy sources. For small amounts of generated electrical energy, already known storage batteries, or more precisely lead-acid and lithium-ion batteries or NaS batteries, are available.

An additional form of electrical energy storage is also provided by electrolysis, for example, i.e. a fluid material such as water is at least partially decomposed into its constituent parts and at least one constituent part is stored. If the stored energy is now to be retrieved, two constituent parts, including the stored constituent part, react to produce the original substance. In this reaction, energy is again produced which, converted into electrical energy, can be fed back into the grid as required. Low-temperature electrolyzers with alkaline electrodes or polymer electrolyte membranes have hitherto been used here. However, electrolyzers of this kind are relatively inefficient. In addition, much energy is required for compressing the hydrogen produced during electrolysis if water is electrolyzed into its constituent elements.

SUMMARY OF INVENTION

An object is to provide an energy storage device for the reversible storage of energy which eliminates the above mentioned disadvantages, in particular is more efficient and at the same time can be manufactured simply and inexpensively.

This object is achieved by an energy storage device for reversibly storing energy, in particular from renewable energy sources, comprising a reversibly designed metal/metal oxide store for indirect storage of energy in the form of at least one fluid material, a reversibly designed electrolysis device for providing and using the fluid material in at least one electrolysis reaction, and fluid exchange means for exchanging fluids between the reversibly designed metal/metal oxide store and the electrolysis device, wherein in particular the metal/metal oxide store is disposed spatially separated from the electrolysis device, and by a method for reversibly storing energy, in particular from renewable energy sources, comprising the following steps:

Feeding generated electrical energy, in particular produced from renewable energy sources, to a reversibly designed electrolysis device, producing at least one fluid material by electrolysis by means of the electrolysis device, storing the fluid material in a metal/metal oxide store in particular spatially separated from the electrolysis device, feeding the at least one stored fluid material from the metal/metal oxide store to the electrolysis device, generating electrical energy by reverse electrolysis by means of the electrolysis device using the at least one fluid material.

Further advantageous developments of the invention are defined in the sub-claims.

The metal/metal oxide store is advantageously designed as an iron/iron oxide store and/or the electrolysis device as a solid oxide electrolysis device. The advantage of this is that, if the store is implemented as an iron/iron oxide store, this is cost effective in respect of the amount of energy that can be stored, as the price of the iron raw material is low. For example, the iron raw material only costs around 0.3 EUR per kW-hour. At the same time, the corresponding energy density is very high, as up to four oxygen atoms can be bound for every three iron atoms, so that, referred to the volume of pure $Fe_3O_4$, about 70% of the energy density of petroleum can be achieved. If the electrolysis device is designed as a solid oxide electrolysis device, the to-be-stored electrical energy of the reversible solid oxide electrolysis device can be effectively utilized, as a decomposition voltage for water vapor is lower at high temperatures than at low temperatures, for example. During autothermal operation, an electrical efficiency of up to 94% referred to an equivalent voltage corresponding to the lower thermal value of gaseous hydrogen can therefore be achieved. In this way, at least 50% of the injected electrical energy can also be recovered as energetic energy, less any small losses due to auxiliary units.

Heat exchanging means and/or heat generating means are expediently designed to exchange thermal energy between the metal/metal oxide store and the electrolysis device and/or to provide heat for operating the energy storage device at a particular temperature. The advantage of this is that, for example, the heat produced when the electrolysis device is being operated as a fuel cell, i.e. in reverse electrolysis mode, can be supplied to the metal/metal oxide store so that a heater may only be required to initially bring the metal/metal oxide store up to operating temperature; it can then be switched off, thereby further increasing the efficiency of the energy storage device.

A starting aid, in particular an evaporator, preferably a water evaporator, for starting up the energy storage device is advantageously provided. An evaporator enables the energy storage device to be started both in storage mode, i.e. charging mode, and in supply mode, i.e. discharging mode. At the same time, the starting aid can also be used to compensate leakage losses. If a water evaporator is used, leakage losses of the gaseous materials water vapor and hydrogen can thus be compensated.

Passive and/or active control means for the fluid exchange means are expediently provided for predefining a direction for the fluid exchange. The passive and/or active control means are designed to control the respective fluid flows within the energy storage device. In this way the energy storage device can be easily and reliably operated in both storage and supply mode. The arrangement of the passive and/or active control means makes it possible to reverse the flow direction of the fluid or fluids, i.e. allows more homogeneous use of the metal/metal oxide store or the reversible electrolysis device. Passive control means can comprise valves, for example, in particular three-way valves.

The active control means preferably comprise a blower, in particular a high-temperature blower. The advantage of this is that, when the fluid material is conveyed by the high-temperature blower, heat is not removed from it and must then be returned to it. In addition, possible condensation of materials is avoided and thus reliable transport of the same material is ensured.

Waste heat utilization means, in particular for the solid oxide electrolysis device, are advantageously provided for converting excess waste heat into preferably electrical energy. This makes it possible to make use of the excess waste heat produced during reverse electrolysis operation of the electrolysis device, thereby enabling the overall efficiency of the energy storage device to be increased still further.

The operating temperature at least of the metal/metal oxide store and/or the solid oxide electrolysis device is advantageously above approximately 500° C., in particular above approximately 750° C., preferably in the range between 800 and 1000° C. The advantage of this is that is allows the energy storage device to be operated at its optimum operating temperature, thus achieving maximum efficiency; the performance of the energy storage device is therefore significantly improved.

BRIEF DESCRIPTION OF THE DRAWINGS

Further advantages and features of the invention will emerge from the following description of exemplary embodiments with reference to the accompanying drawings in which:

FIG. 2 schematically illustrates a design of an energy storage device according to a second embodiment of the present invention;

FIG. 3 shows a method according to the first embodiment of the present invention.

DETAILED DESCRIPTION OF INVENTION

Figure 1:
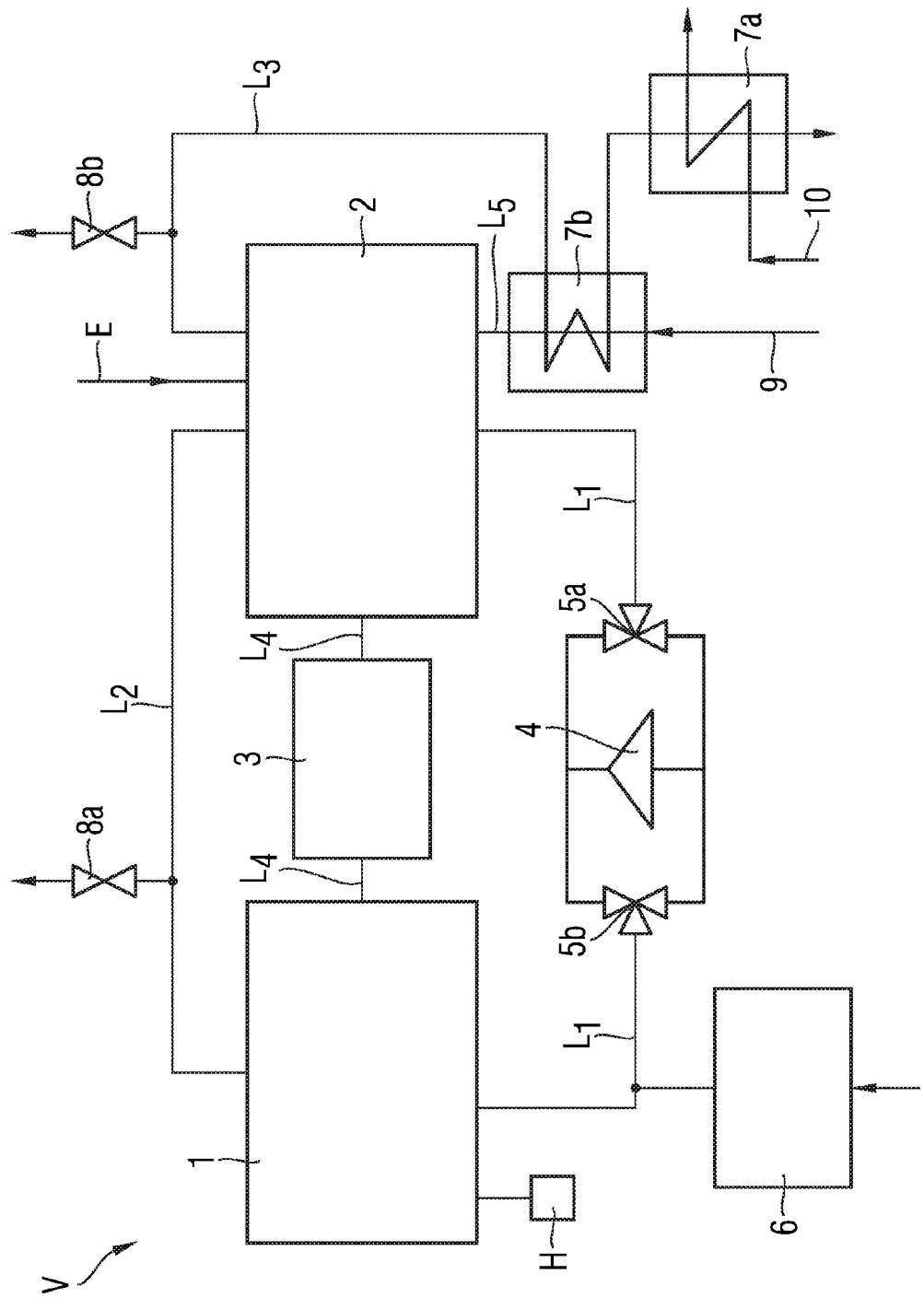
FIG. 1 schematically illustrates a design of an energy storage device according to a first embodiment of the present invention.

FIG. 1 schematically illustrates a design of an energy storage device according to a first embodiment of the present invention.

In FIG. 1, reference character V denotes an energy storage device V according to the first embodiment of the present invention. It comprises a metal/metal oxide store 1 and a solid oxide electrolysis device 2 which are interconnected via lines $L_1$, $L_2$ for exchanging fluids, here water vapor and gaseous hydrogen respectively. Additionally disposed in the line $L_1$ are a high-temperature blower 4 and three-way valves 5a, 5b downstream and upstream respectively of the high-temperature blower 4. The high-temperature blower 4 and the three-way valves 5a, 5b are used to control the direction of the fluid flowing through the lines $L_1$ and $L_2$ from the metal/metal oxide store 1 to the solid oxide electrolysis device 2 and vice versa.

An extraction valve 8a is disposed on the line $L_2$ in order to be able to extract hydrogen gas and/or water vapor. In addition to the fluidic coupling of solid oxide electrolysis device 2 and metal/metal oxide store 1 by means of the lines $L_1$, $L_2$, heat exchanging means are provided 3 which are thermally coupled via lines $L_4$ or similar to the solid oxide electrolysis device 2 on the one hand and to the metal/metal oxide store 1 on the other, for exchanging heat.

Additionally disposed on the line $L_1$ is a water evaporator 6 which is used to introduce water vapor into the energy storage device V. The water evaporator 6 enables the energy storage device to be started up both in electrolysis (charging) mode and in reverse electrolysis (discharging) mode. Connected to the solid oxide electrolysis device 2 is another line $L_3$ which has another extraction valve 8b to enable gaseous oxygen to be drawn off. The other part of the line $L_3$ leads into a first heat exchanger 7b which supplies air 9 required for the solid oxide electrolysis device 2 and produces a temperature rise therein. Disposed downstream of the heat exchanger 7b is another heat exchanger 7a which is used for extracting excess heat from the energy storage device V. For this purpose an appropriate heat transfer medium 10 flows through the heat exchanger 7a.

The interaction of the individual components for an energy store or more especially for retrieving electrical energy will now be described in detail:

To start up the energy storage device V in order to store electrical energy E from the outside, energy is first applied to the water evaporator 6 and liquid water present therein or rather supplied to said evaporator 6 is evaporated. The water vapor is then injected via the lines $L_1$, the valves 5b, the high-temperature blower 4, and the valve 5a into the solid oxide electrolysis device 2 where it is then electrolyzed into hydrogen and oxygen by means of the supplied electrical energy E.

The oxygen is then discharged via the line $L_3$ and can then be tapped off for further processing, for example, via the valve 8b. During this electrolysis process, the solid oxide electrolysis device 2 is at a temperature of approximately 900° C. The hydrogen is now conveyed together with any water vapor via the lines $L_2$ according to FIG. 1 to the iron/iron oxide store 1 by means of the high-temperature blower 4 and the valves 5a, 5b.

In order to now store the hydrogen, the hydrogen reacts with the iron oxide of the iron/iron oxide store 1, e.g. $Fe_3O_4 + 4H_2 \rightarrow 3Fe + 4H_2O$. The resulting water or rather water vapor is now transported by means of the blower 4 via the line $L_1$ and the valves 5b, 5a to the solid oxide electrolysis device 2, where the water is then decomposed into hydrogen and oxygen.

Conversely, i.e. to retrieve the energy in the form of the reduced iron oxide from the iron/iron oxide store 1, water vapor is now transported into the iron/iron oxide store via the water evaporator 6 by means of the high-temperature blower 4 and the valve 5b. By means of the reaction $3Fe + 4H_2O \rightarrow Fe_3O_4 + 4H_2$, the resulting hydrogen is transported to the solid oxide electrolysis device 2 indirectly via the high temperature blower 4 via the line $L_2$. Air 9 is also transported to the solid oxide device 2 via a line $L_5$; the oxygen thereof then reacts with the hydrogen from the iron/iron oxide store 1 to produce water or rather water vapor. The water vapor is returned via the line $L_1$, the valve 5a, the blower 4, and the valve 5b to the iron/iron oxide store 1 where further iron is oxidized with the production of hydrogen.

In order to minimize heat losses, the energy storage device V is appropriately insulated. In order to homogenize the average temperature inside the device as effectively as possible, a thermal coupling is disposed between the iron/iron oxide store 1 and the fixed oxide electrolysis device 2 in the form of heat exchanging means 3 and lines $L_4$.

FIG. 2 shows an energy storage device according to a second embodiment of the present invention. Schematically illustrated in FIG. 2 is an energy storage device V comprising a plurality of iron/iron oxide stores 1a, 1b, 1c and a plurality of solid oxide electrolysis devices 2a, 2b. These are disposed directly adjacent and alternately. The heat exchange between the iron/iron oxide stores 1a, 1b, 1c and the solid oxide electrolysis devices 2a, 2b takes place by means of convection, thermal conduction and/or radiation. The solid oxide electrolysis devices 2a, 2b are interconnected via a common line $L_1$. Similarly to FIG. 1, water vapor is then fed via the lines $L_1$ to the solid oxide electrolysis devices 2a, 2b which decompose the water vapor or water into hydrogen and oxygen. The hydrogen produced by the solid oxide electrolysis devices 2a, 2b is fed from the solid oxide electrolysis devices 2a, 2b via a common line $L_2$ to the iron/iron oxide stores 1a, 1b, 1c where the hydrogen can be stored in the iron/iron oxide stores 1a, 1b, 1c with the formation of water. The water thus formed is now again fed from the iron/iron oxide stores 1a, 1b, 1c via a common line $L_1$ to the parallel-connected solid oxide electrolysis devices 2a, 2b. The method for retrieving the stored energy from the iron/iron oxide store 1a, 1b, 1c then takes place in a similar manner to that described in connection with FIG. 1. A high-temperature blower 4 then accordingly controls the flow direction of the hydrogen and water vapor stream from/to the iron/iron oxide stores 1a, 1b, 1c and the solid oxide electrolysis devices 2a, 2b respectively.

FIG. 3 shows a flow chart of a method as claimed, comprising the following steps:
 feeding (S1) generated electrical energy to a reversibly designed electrolysis device (2),
 producing (S2) at least one fluid material by electrolysis by means of the electrolysis device (2),
 storing (S3) the fluid material in a metal/metal oxide store (1) that is in particular spatially separated from the electrolysis device (2),
 feeding (S4) the at least one stored fluid material from the metal/metal oxide store (1) to the electrolysis device (2),
 generating (S5) electrical energy by reverse electrolysis by means of the electrolysis device using the at least one fluid material.

Although the present invention has preferably been described on the basis of preferred exemplary embodiments, it is not restricted thereto, but can be modified in a variety of ways.

For example, the iron/iron oxide store can consist of finely structured iron or iron oxide particles, e.g. particles or wires having diameters of approximately 0.01 to 1 mm. In order to ensure good hydrogen or water vapor flows through the iron/iron oxide store, these can be provided with a finely structured ceramic material, e.g. powders or fibers of aluminum trioxide. This also prevents sintering of the particles or wires. It is also possible sinter the mixture of particles and/or wires to produce a porous overall body or small porous bodies which are introduced as filling. In addition, it is possible also to provide a heater in the metal/metal oxide store.

The invention claimed is:

1. An energy storage device for a reversible storage of energy, comprising:
 a reversibly designed metal/metal oxide storage unit for indirectly storing energy in form of a fluid material,
 a reversibly designed electrolysis device for providing and using the fluid material in an electrolysis reaction,
  wherein the metal/metal oxide storage unit is disposed spatially separated from the electrolysis device,
 a fluid exchanging unit for exchanging the fluid material between the reversibly designed metal/metal oxide storage unit and the electrolysis device,
 wherein the fluid exchanging unit comprises passive and active control devices for controlling a direction for the fluid exchange, and
 a heat exchanging unit for exchanging thermal energy between the metal/metal oxide storage unit and the electrolysis device.

2. The energy storage device as claimed in claim 1, wherein the metal/metal oxide storage unit is implemented as an iron/iron oxide store and/or the electrolysis device as a solid oxide electrolysis device.

3. The energy storage device as claimed in claim 1, further comprising:
 a heat generating unit for providing heat for operating the energy storage device at a particular temperature.

4. The energy storage device as claimed in 1, further comprising:
 a starting aid for starting the energy storage device.

5. The energy storage device as claimed in claim 4, wherein the starting aid is a water evaporator.

6. The energy storage device as claimed in claim 1, wherein the active control devices include a high-temperature blower.

7. The energy storage device as claimed in claim 1, further comprising:
 waste heat utilization unit for converting excess waste heat into electrical energy.

8. The energy storage device as claimed in claim 1, wherein an operating temperature of the metal/metal oxide storage unit and/or the electrolysis device is above approximately 500° C.

9. The energy storage device as claimed in claim 8, wherein the operating temperature of the metal/metal oxide storage unit and/or the electrolysis device is between 800° C. and 1000° C.

10. The energy storage device as claimed in claim 1, wherein the metal/metal oxide storage unit is an iron/iron oxide storage unit and electrolysis device is a solid oxide electrolysis device.

\* \* \* \* \*